United States Patent [19]

Smith

[11] 4,316,347

[45] Feb. 23, 1982

[54] PORTABLE SOLAR GARDEN

[76] Inventor: Alvin H. Smith, 11901 Lakewood Blvd., Apt. #12, Downey, Calif. 90241

[21] Appl. No.: 161,287

[22] Filed: Jun. 20, 1980

[51] Int. Cl.³ .............................................. A01G 9/00
[52] U.S. Cl. ........................................... 47/17; 47/67
[58] Field of Search ...................... 47/17, 39, 82–83, 47/1, 67; D25/15; 119/15

[56] References Cited

U.S. PATENT DOCUMENTS

| | | | |
|---|---|---|---|
| 875,235 | 12/1907 | Bastel | 47/82 |
| 3,336,773 | 8/1967 | Oechslin | 47/17 X |
| 3,961,442 | 6/1976 | Carter | 47/17 |
| 4,065,876 | 1/1978 | Moffett | 47/83 |
| 4,216,741 | 8/1980 | Moss | 47/17 X |
| 4,250,666 | 2/1981 | Rakestraw | 47/83 |

FOREIGN PATENT DOCUMENTS

| | | | |
|---|---|---|---|
| 1370481 | 10/1974 | United Kingdom | 47/17 |
| 682181 | 8/1979 | U.S.S.R. | 47/17 |

*Primary Examiner*—Robert E. Bagwill
*Attorney, Agent, or Firm*—Poms, Smith, Lande & Rose

[57] ABSTRACT

A portable solar garden which is large enough to accommodate an individual for gardening operations, yet is portable for movement within a given living area and outdoors.

The portable solar garden includes a self-contained water supply and a removable top which may also be used for hanging pots and tools. Box-like shelves are also included for broadening the possible gardening operations which can be performed within the portable solar garden.

7 Claims, 4 Drawing Figures

PORTABLE SOLAR GARDEN

BACKGROUND OF THE INVENTION

Modern society is characterized by the ever-increasing size of our urban centers. Along with urban sprawl, there is an ever-increasing demand for land in and around urban communities. As a result, land and building developers have turned to the increasing use of high density housing to maximize land utilization in urban areas.

The trend towards high density housing, such as condominiums and apartments is expected to continue into the foreseeable future. More and more city dwellers will therefore find themselves residing in such high density living quarters. Even in urban areas where single family dwellings are available, the average city dweller will be forced into high density housing due to the rapidly escalating prices of detached homes in many urban communities.

A common problem inherent in high density urban housing is the lack of personal gardens. It is a common desire of many individuals to have their own personal garden. This desire is exemplified in rural settings by the home garden, greenhouses and the like. In high density housing, this desire is exemplified by the conglomeration of pots and planters found inside and outside of condominiums and apartments.

Optimally, it would be desirable to have a full-sized greenhouse or garden within the high density living quarters. As these two options are impractical, most urban dwellers have turned to the use of pots and window planters for fullfilling their desires to be gardeners. The problem with pots is that they tend to clutter the living quarters and dirt becomes scattered about during gardening operations. Window planters don't cause the problems experienced with pots, but are not portable.

There is presently a need for a portable indoor garden center for visually displaying an indoor garden while at the same time providing a suitable work area for an individual to tend to the garden.

SUMMARY OF THE INVENTION

It is therefore an object of the present invention to provide an indoor garden center which is sufficiently large to accommodate not ony numerous plants, but also a full-sized individual for gardening purposes.

A further object of the present invention is to provide an indoor garden center which has a self-contained water system for watering plants therein without regard to location of water supplies within any given structure.

Another object of the present invention is to disclose and provide a indoor garden center which is portable in nature and can be moved freely throughout an indoor area and may also be easily moved outdoors if desired.

Another object of the present invention is to provide an indoor garden center which can be easily assembled and disassembled to allow easy and compact shipping and storing when necessary.

The above objects and others are accomplished in accordance with the present invention by a portable indoor garden center which is large enough to accommodate numerous plants and at least one individual while being provided with casters or the like to render the garden center portable.

The garden center includes a self-contained watering system wherein water is gravity fed from a water container through a hose to a spray nozzle or the like for applications to plants, etc. The water container is mounted on top of the garden center for quick removal and refill when necessary. The water container covers a hole in the top of the garden center when it is mounted thereon. This opening or hole serves the dual purpose of allowing fresh air and sunlight into the garden center with it is placed outside. In addition, a cover is provided for covering the hole when desired. The cover is provided with a transparent central window to permit light entry into the garden center when the cover is in place. Further, the cover may include hanging means extending out from the top of the garden center for hanging suitable pots, tools or the like. The portable garden center is constructed so as to be quickly assembled and disassembled.

A more complete understanding of the indoor garden center in accordance with the present invention, as well as recognition of additional objects and advantages therefore, will be afforded to those skilled in the art from a consideration of the following detailed description of an exemplary embodiment thereof. Reference will be made to the appended drawings which will first be discussed briefly.

DETAILED DESCRIPTION OF THE INVENTION

Figure 1:
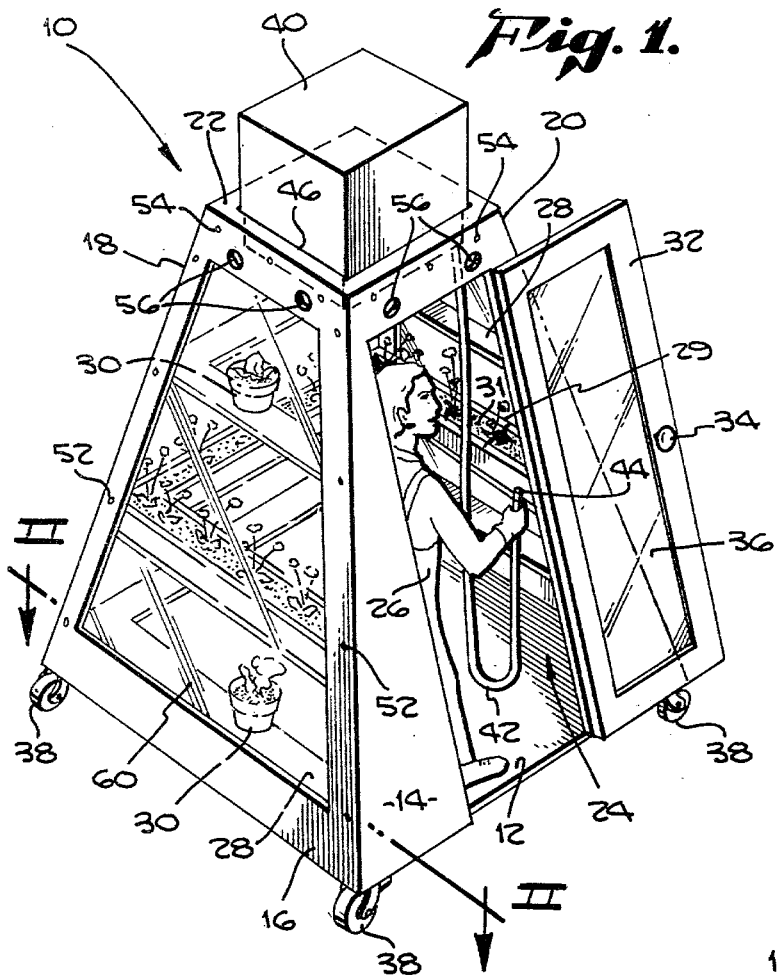
FIG. 1 is a perspective view of a preferred embodiment of the present invention with the self-contained watering system in place.

A preferred embodiment of the portable solar garden of the present invention is shown generally at 10 in FIG. 1. The portable solar garden 10 or terrarium is composed basically of a bottom portion shown as square base 12, sunlight passing walls 14, 16, 18 and 20, and top 22.

The base, walls and top define a garden zone shown generally at 24. The dimensions of the garden zone 24 are such that an individual 26 may conveniently perform gardening operations therein. Inside the garden zone 24 are arranged shelves 28 upon which are placed any number of desired plants. The plants may be in pots as shown at 30 or may be placed in other suitable containers.

Figure 3:
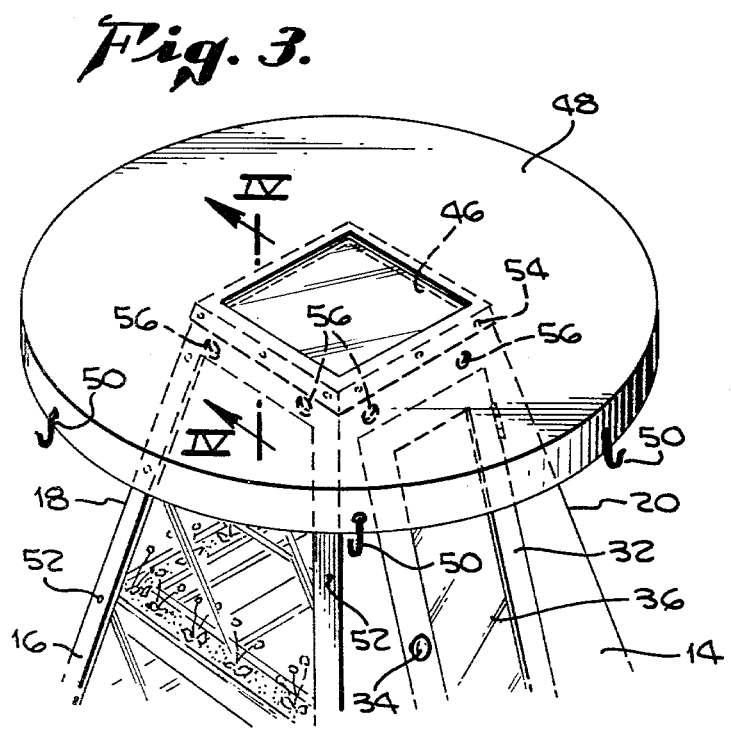
FIG. 3 is a perspective view of the top portion of a preferred embodiment with the self-contained watering system removed and the preferred cover in place.

As shown at 29 in FIGS. 1 and 3, a shelf is constructed in a box shaped configuration. The box-like shelf 29 is filled with soil 31 in which suitable plants may be planted and grown. Box-like shelf 29 allows the gardener to prepare his own soil and widens possible gardening operations beyond those possible when just pots are available for gardening.

Human passageway means such as door 32 is provided for allowing passage into and out of the portable solar garden 10. The door is provided with handle 34 and also includes a relatively transparent window 36 for allowing passage of sunlight into the garden zone 24 when the door is in the closed position. Preferably, the door is of sufficient dimensions to allow an individual to pass into the garden zone 24 in a relatively upright position.

Movement means such as casters 38 are provided to allow easy relocation of the portable solar garden 10 throughout a given home or other building and for moving the portable solar garden outdoors. Since the portable solar garden 10 will be large enough to hold numerous plants and at least one individual, the casters 38 are necessary to provide the portability which is desired as part of the present invention.

Self-contained watering means are shown in FIG. 1 including water reservoir 40, hose 42 and nozzle 44. The water container 40 may be of any convenient size but preferably holds at least 5 to 10 gallons of water. The water container 40 is shown mounted in place on top 22. Preferably, the water container 40 fits matingly into opening 46 (best shown in FIG. 3). Retaining surfaces (not shown) are provided to prevent the water container 40 from sliding completely through opening 46 or as an alternative, the base of the water container 40 could be wider than opening 46 thereby allowing the container to sit freely atop the portable garden 10. It is preferred that the water container 40 fit in a slightly recessed manner into opening 46 as shown in FIG. 1 to prevent the water container from slipping off the top 22 of the solar garden 10 during transportation of the solar garden 10 by way of casters 38. It should be noted, that for safety purposes, the casters 38 should be provided with lock devices to lock the portable garden 10 in a stationary position when desired.

Water is transferred from the water container 40 to the plants or other desired objects within the garden zone 24 by way of hose 42. A nozzle 44 is provided to control desired water application. Flow of water through hose 42 may be controlled either by providing a suitable valve operated nozzle or by providing a shut-off valve between the hose 42 and water container 40. Preferably, both a main shut-off at the water container and also a nozzle having water flow control means are desired.

As can be seen in FIG. 1, the preferred design of the portable solar garden 10 is a truncated right pyramid. The square base 12 forms the base of the truncated pyramid with walls 14, 16, 18 and 20 forming the sides. This particular design is preferred because it is not only aesthetically pleasing but serves several functional purposes. Specifically, the right truncated pyramid design allows for easy placement of the water container 40 on top thereof to provide a gravity feed water system. The pressure developed in such a system is sufficient to produce a water spray through a suitable spray nozzle 44. As is well-known, the spraying of certain plants with water during gardening operations is particularly desirable. Further, the truncated pyramid shape maximizes the interior work area provided for gardening operations by an individual while minimizing the amount of area which is displaced in the typical indoor setting where usable living space is generally at a minimum. Additionally, as will be discussed later, the narrower cross-section of the top portion in relation to the base portion of the right truncated pyramid configuration allows the hanging of articles from a suitably placed lid or cover.

The walls 14, 16, 18 and 20 are preferably constructed having a maximum amount of area made of transparent material. If suitable transparent materials are available having sufficient strength to support the various loading factors produced by individuals, plants and water container 40, they may be used. However, it is preferred that the walls be constructed to include transparent windows made of glass or plastic which are mounted within strong reinforced frames which are then attached to each other to form the desired pyramid shape.

Due to the portability of the solar garden 10, there will be occasions when the garden 10 will be located near a fixed source of water thereby removing the desirability of having a self-contained water system. Also, the water system may be removed for other various reasons at different times. In accordance with the present invention, when the water system (including water container 40, hose 42 and nozzle 44) is removed from the solar garden 10, a suitable cover 48 may be placed on the top 22 of the solar garden 10. Although many different suitable shapes for the cover are available and could be used, the preferred cover 48 is a circular transparent disc made of a suitable lightweight and strong plastic material. The diameter of the cover 48 is sufficiently greater than the width or length of top 22 to allow for vertical hanging of objects from hooks 50 without the objects bumping against the portable garden walls. As previously mentioned, the pyramid shape of the solar garden is essential in this aspect to provide a wide base at the bottom thereof for walking or standing within the garden zone 24 while at the same time allowing the placement of a suitable cover such as 48 of reasonable size on the smaller top thereof to allow for the free hanging of pots, tools or the like. If desired, the cover 48 may be made of a suitable opaque material with at least a transparent central portion to allow the passage of sunlight through opening 46. However, a substantially transparent cover 48 is desired to permit passage of overhead sunlight rays through the cover and into the windows within walls 14, 16, 18 and 20.

Figure 2:
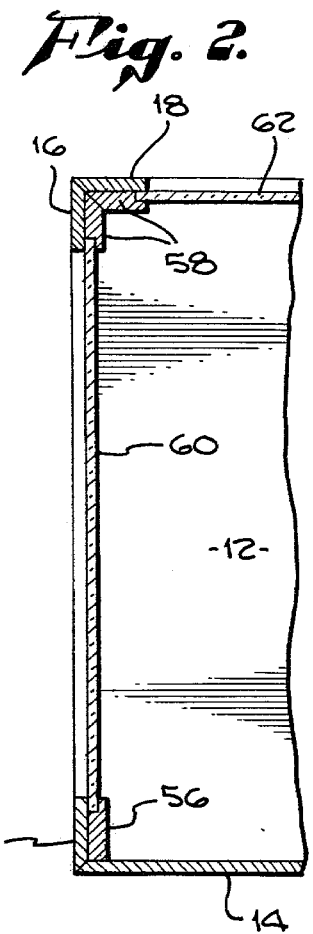
FIG. 2 is a cross-sectional view of FIG. 1 taken along the II—II plane.
Figure 4:
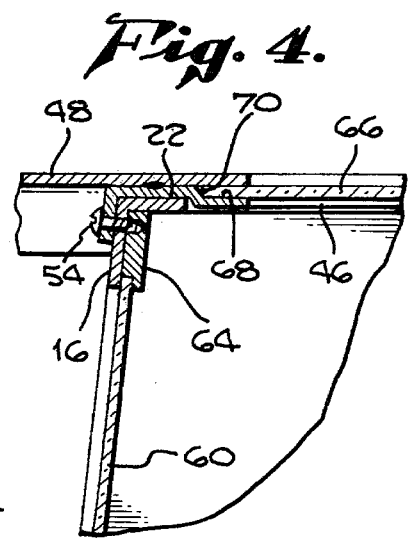
FIG. 4 is a cross-sectional view of FIG. 3 taken in the IV—IV plane.

In addition to the portability of the solar garden 10, provision is made for quickly assembling and disassembling the portable garden 10. This is accomplished by securing the walls 14, 16, 18 and 20 to each other along their common edges by fasteners such as screws 52. The top 22 of the solar garden 10 is also attached to each of the walls by quick release fasteners such as screws 54. The screws 54 are located just above vent holes 56 which are provided in the portable garden walls for ventilation purposes. The bottomless pyramid formed by the connected walls may be matingly placed upon base 12 with only the force of gravity holding the pyramid thereon; however, it is preferred that some type of quickly releasable fasteners be provided for securing the walls 14, 16, 18 and 20 to the base 12. Suitable fasteners could be screws (not shown) or other easily removed fasteners. Details of the quick release construction of the preferred embodiment of the present invention are shown in FIGS. 2 and 4. In FIG. 2, corner braces 56 and 58 are provided for securing wall 14 to wall 16 and wall 16 to wall 18 respectively. The corner braces can be made from any suitable strong material such as wood or suitably machined metal or plastic to allow for anchoring screws or bolts therethrough. As shown in the preferred embodiment, the corner braces 56 and 58 also serve to support windows 60 and 62 within their respective walls. This allows for quick removal of the window panes from their respective walls during disassembly by removal of the corner braces.

FIG. 4 shows the attachment of wall 16 to top 22. This attachment is typical of the attachment of the other three walls to the top 22. A top brace 64 is provided for anchoring a fastener such as screw 54 which has been passed through top 22 and wall 16 to thereby sandwich and securely attach the top 22 and wall 16 between top brace 64 and the head of screw 54.

As will be realized, by simply removing screws 52 and 54, the solar garden may be quickly disassembled. Conversely, the solar garden 10 may be quickly assembled by attaching screws 52 and 54 as indicated. Shelves then may be placed appropriately within the solar garden 10 by suitable fastening means. The pyramid structure of the solar garden 10 is then seated appropriately on base 12 and secured thereto if desired.

As shown in FIG. 4, the cover 48, has a transparent central portion 66 which coincides substantially with the central opening 46 in top 22. The transparent portion 66 of cover 48 is offset so that it abuts against surfaces 68 and 70 to prevent slippage of cover 48 when the cover is matingly placed over top 22.

Having thus described an exemplary embodiment of the present invention, it should be noted by those skilled in the art that the within disclosures are exemplary only and that various other alternatives, adaptations and modifications may be made within the scope of the present invention. Thus, by way of example and not of limitation, if desired a three-walled right truncated pyramid structure could be utilized in accordance with the present invention having a triangular base. Further, a triangular or rectangular cover configuration might also be desirable instead of the circular configuration shown. Accordingly, the present invention is not limited to the specific embodiment as illustrated herein.

I claim:

1. A portable indoor-outdoor terrarium comprising:

a bottom portion, sunlight passing walls and a top portion defining a garden zone;

human passageway means for passage of persons into and out of said garden zone;

self contained watering means for providing water under pressure to said garden zone, said watering means includes a water container releasably mounted on said top portion, and a hose connected to said water container for transferring water to a water delivery nozzle for application to spaced locations within said garden zone;

removable hanging means extending outward from said top for hanging hangable articles; and movement means attached to said bottom portion for reducing friction during horizontal movement of said terrarium.

2. A terrarium according to claim 1 wherein said bottom portion, said walls and said top portion are attached together by releasable connection means.

3. A terrarium according to claim 2 wherein said top portion is the top, said walls are the sides and said bottom portion is the base of a truncated right pyramid.

4. A terrarium according to claim 3 wherein said top defines an opening and further including removable cover means for covering said opening.

5. A terrarium according to claim 4 wherein said cover means includes a light transmitting window.

6. A terrarium according to claim 4 including at least one box-like shelf within said garden zone.

7. A terrarium according to claim 3 wherein the sides of said truncated right pryamid include transparent windows.

* * * * *